(12) United States Patent
Ghalambor et al.

(10) Patent No.: US 9,121,507 B2
(45) Date of Patent: Sep. 1, 2015

(54) SPRINGS AND METHODS OF FORMING SAME

(71) Applicant: Saint-Gobain Performance Plastics Corporation, Aurora, OH (US)

(72) Inventors: Hamid Reza Ghalambor, Irvine, CA (US); Karthik Vaideeswaran, Redondo Beach, CA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 0 days.

(21) Appl. No.: 14/333,141

(22) Filed: Jul. 16, 2014

(65) Prior Publication Data

US 2014/0360020 A1    Dec. 11, 2014

Related U.S. Application Data

(62) Division of application No. 12/981,295, filed on Dec. 29, 2010, now abandoned.

(60) Provisional application No. 61/290,711, filed on Dec. 29, 2009.

(51) Int. Cl.
| | |
|---|---|
| *F16J 15/16* | (2006.01) |
| *B23P 13/00* | (2006.01) |
| *F16J 15/34* | (2006.01) |
| *F16J 15/32* | (2006.01) |

(Continued)

(52) U.S. Cl.
CPC ......... *F16J 15/3452* (2013.01); *B23K 26/0093* (2013.01); *F16F 1/02* (2013.01); *F16J 15/3212* (2013.01); *F16J 15/3236* (2013.01); *Y10T 29/49609* (2015.01)

(58) Field of Classification Search
USPC ........... 267/1.5, 158, 160, 167; 277/467, 555, 277/558, 644
See application file for complete search history.

(56) References Cited

U.S. PATENT DOCUMENTS

| | | | |
|---|---|---|---|
| 2,600,434 A | 6/1952 | Saywell | |
| 4,133,542 A * | 1/1979 | Janian et al. | .................. 277/555 |
| 4,585,239 A | 4/1986 | Nicholson | |

(Continued)

FOREIGN PATENT DOCUMENTS

| | | |
|---|---|---|
| CN | 100398249 C | 7/2008 |
| CN | 101386109 A | 3/2009 |

(Continued)

OTHER PUBLICATIONS

Saint-Gobain Performance Plastics, "OmniSeal® Handbook: Reliability That Withstands the Test of Time", 2007, 27 pages; accessed Mar. 17, 2011 <http://www.seals.saint-gobain.com/uploadedFiles/SGseals2/Secure_Customer_Area/Seals_Distributors/OmniSeal-US.pdf>.

(Continued)

*Primary Examiner* — Christopher Schwartz
(74) *Attorney, Agent, or Firm* — Abel Law Group, LLP; Chi Suk Kim

(57) ABSTRACT

A seal includes a polymeric jacket defining a seal surface and an inner cavity extending within the polymeric jacket along a length of the polymeric jacket. The seal further includes a spring extending within the inner cavity and including a plurality of laser cut spring elements. The seal can be disposed between a static component and a rotatable component.

20 Claims, 5 Drawing Sheets

(51) Int. Cl.
*B23K 26/00* (2014.01)
*F16F 1/02* (2006.01)

(56) References Cited

U.S. PATENT DOCUMENTS

| | | | |
|---|---|---|---|
| 4,706,970 A | 11/1987 | Ramirez | |
| 5,160,122 A * | 11/1992 | Balsells | 267/167 |
| 5,163,692 A | 11/1992 | Schofield et al. | |
| 5,265,890 A * | 11/1993 | Balsells | 277/467 |
| 5,285,669 A * | 2/1994 | Itaya | 72/132 |
| 5,444,210 A | 8/1995 | Eingener et al. | |
| 5,630,591 A * | 5/1997 | Drijver et al. | 277/553 |
| 5,799,953 A | 9/1998 | Henderson | |
| 6,547,250 B1 | 4/2003 | Noble et al. | |
| 6,789,803 B2 | 9/2004 | Radosav | |
| 6,881,923 B2 * | 4/2005 | Battaglia | 219/121.67 |
| 7,464,941 B2 * | 12/2008 | Hashimoto | 277/558 |
| 7,497,443 B1 * | 3/2009 | Steinetz et al. | 277/644 |
| 7,587,244 B2 * | 9/2009 | Olbertz | 607/37 |
| 8,828,178 B2 * | 9/2014 | Yamamoto et al. | 156/281 |
| 2002/0153664 A1 | 10/2002 | Schroeder | |
| 2006/0004419 A1 | 1/2006 | Olbertz | |
| 2006/0118529 A1 * | 6/2006 | Aoki et al. | 219/121.67 |
| 2007/0176372 A1 | 8/2007 | Racicot | |
| 2008/0157631 A1 | 7/2008 | Heim et al. | |
| 2008/0302156 A1 | 12/2008 | Itaya | |
| 2009/0103579 A1 | 4/2009 | Ushimaru et al. | |

FOREIGN PATENT DOCUMENTS

| | | |
|---|---|---|
| EP | 595253 B1 | 8/1995 |
| EP | 1296798 B1 | 2/2009 |
| JP | H0712163 A | 1/1995 |
| JP | H09-010846 A | 1/1997 |
| JP | H1094894 A | 4/1998 |
| JP | 2001050397 A | 2/2001 |
| JP | 2002-147614 A | 5/2002 |
| JP | 2003247646 A | 9/2003 |
| JP | 2005248167 A | 9/2005 |
| JP | 2009012069 A | 1/2009 |
| JP | 2009101386 A | 5/2009 |
| JP | 2009226473 A | 10/2009 |
| JP | 2009299787 A | 12/2009 |
| KR | 20-0433722 Y1 | 12/2006 |
| RU | 92013039 | 2/1995 |
| RU | 2288084 C1 | 11/2006 |
| RU | 86129 U1 | 8/2009 |
| WO | 2006/126451 A1 | 11/2006 |

OTHER PUBLICATIONS

Saint-Gobain Perforamnce Plastics, "OmniSeal® Product Selection Guide", 2 pages; accessed Mar. 17, 2011 <http://www.seals.saint-gobain.com/uploadedFiles/SGseals2/Documents/OmniSeal_Docs/OmniSeal-Selection-Guide.pdf>.
Saint-Gobain Perforamnce Plastics, "How OmniSeals Work", 1 page; accessed Mar. 17, 2011 <http://www.seals.saint-gobain.com/uploadedFiles/SGseals2/Documents/OmniSeal_Docs/HowOmniSealWorks.pdf>.
International Search Report from PCT Application No. PCT/US2010/062415, 1pg.
Office Action dated Mar. 6, 2013, with regard to corresponding Russian patent application No. 2012129248, filed Jul. 11, 2012.
"Comparison of Various Types of Lasers", <http://www.ntoire-polus.ru>, Dec. 15, 2008, 2 pages.

* cited by examiner

SPRINGS AND METHODS OF FORMING SAME

CROSS-REFERENCE TO RELATED APPLICATION(S)

The present application is a divisional application of U.S. Non-Provisional patent application Ser. No. 12/981,295, filed Dec. 29, 2010, entitled "SPRINGS AND METHODS OF FORMING SAME", naming inventors Hamid Reza Ghalambor and Karthik Vaideeswaran, which in turn is a non-provisional application of and claims priority from U.S. Provisional Patent Application No. 61/290,711, filed Dec. 29, 2009, entitled "SPRINGS AND METHODS OF FORMING SAME," naming inventors Hamid Reza Ghalambor and Karthik Vaideeswaran, both of which are incorporated by reference herein in their entireties.

FIELD OF THE DISCLOSURE

This disclosure, in general, relates to springs, seals using such springs, and methods for forming such springs and seals.

BACKGROUND

Springs are used in a variety of industries to apply force in a particular direction. In particular, springs are used in seal applications to energize sealing material into contact with a surface and to promote formation of a seal between parts moving relative to one another. Springs useful in such seals can include helically round ribbon or folded flat stock springs.

Folded flat stock springs are conventionally formed through stamping processes. Flat stock is conventionally supplied to a stamping machine that stamps a pattern into the flat stock and the patterned flat stock is subsequently folded to form the flat stock spring. Such springs can be incorporated into seals, such as annular seals or face seals.

However, the conventional stamping process introduces stress into the stamped form, particularly around the edges. Further, stamping results in a considerable amount of waste material and can form burrs and undesirable sharp protrusions on edges of a spring. In addition, such conventional stamping processes are not conducive to continuous processing of metal components and as such, tend to be performed in batch processes, reducing the efficiency of production.

As such, an improved spring and method for forming such springs would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

In a particular embodiment, a method of forming a spring includes dispensing a ribbon of flat stock or sheet metal, cutting the flat stock or sheet metal with a laser cutting apparatus to form a plurality of spring elements distributed longitudinally along the ribbon, and folding the laser cut ribbon to form a spring. In an example, folding includes folding to form a longitudinal crease. In particular, such folding can form the ribbon or flat stock into a spring having a V-shaped or U-shaped cross section. Further, the spring elements can include tines, loops, or other structures that, when in position, push against another object such as a seal jacket. In a particular example, the spring can be inserted into the cavity of a seal jacket, such as an annular jacket, to form a seal.

In another embodiment, a method of forming a spring includes dispensing a tube and cutting the tube with a laser to form a spring. In an example, the laser cutting results in a spiral cut around the circumference of the tube. The tube can be rotated during cutting. The laser cut tube can be inserted into the cavity of a seal jacket.

Figure 1:
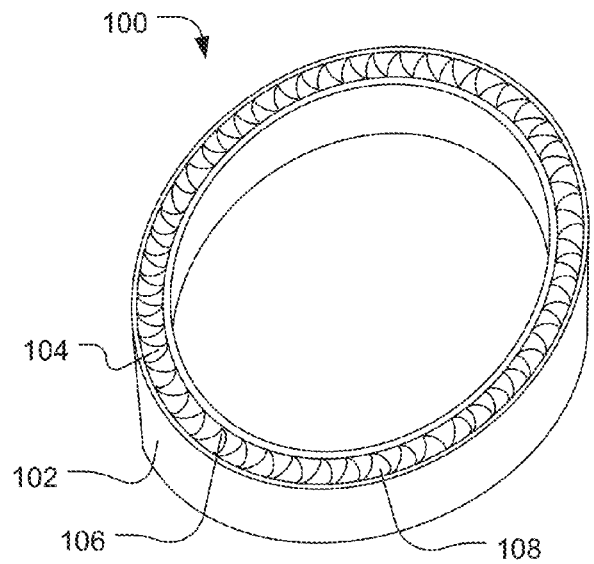
FIG. 1 includes a perspective-view illustration of an exemplary seal.
Figure 2:
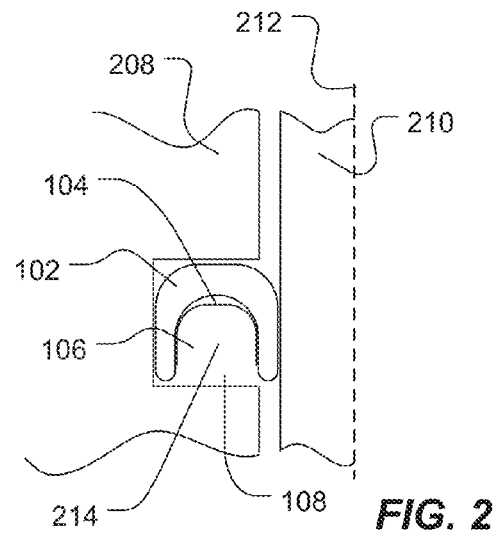
FIG. 2 includes a cross-sectional view illustration of an exemplary seal, such as the exemplary seal illustrated in FIG. 1.

In an embodiment illustrated in FIG. 1, the seal 100 includes a jacket 102 and a spring 104 disposed within a cavity 106 of the jacket 102. As illustrated, the seal 100 is an annular seal which can, for example, be disposed in an annular space around an axis. As illustrated in FIG. 2, the seal 100 can be disposed within an annular region 214 of a component 208. The spring 104 energizes the jacket 102 to contact a rotating component 210 that rotates around an axis 212. The sidewalls 110 of the spring 104 energize the sidewalls 112 of the jacket 102 to maintain contact with the moving and static components (210 and 208).

The jacket 102 can be formed of a polymeric material or a composite material including a polymeric material. The polymeric material can include a thermoplastic material, such as an engineering or high performance thermoplastic polymer. For example, the thermoplastic material can include a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, a liquid crystal polymer, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or any combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or any combination thereof. In a further example, the thermoplastic material includes polyketone, such as polyether ether ketone (PEEK), polyether ketone, polyether ketone ketone, polyether ketone ether ketone ketone, a derivative thereof, or a combination thereof. An example thermoplastic fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE),), a copolymer of ethylene and fluorinated ethylene propylene (EFEP), polyvinyl fluoride (PVF), a terpolymer of tetrafluoroethylene, hexafluoropropylene, and ethylene (HTE), or any combination thereof. An exemplary liquid crystal polymer includes aromatic polyester polymers, such as those available under tradenames XYDAR® (Amoco), VECTRA® (Hoechst Celanese), SUMIKOSUPER™ or EKONOL™ (Sumitomo Chemical), DuPont HX™ or DuPont ZENITE™ (E.I. DuPont de Nemours), RODRUN™ (Unitika), GRANLAR™ (Grandmont), or any combination thereof. In an additional example, the thermoplastic polymer can be ultra high molecular weight polyethylene.

The composite material can also include a filler, such as a solid lubricant, a ceramic or mineral filler, a polymer filler, a fiber filler, a metal particulate filler, salts, or any combination thereof. An exemplary solid lubricant includes polytetrafluoroethylene, molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof. An exemplary polymer filler includes polyimide, liquid crystal polymers, polybenzimidazole, polytetrafluoroethylene, any of the thermoplastic polymers listed above, or any combination thereof. An exemplary fiber includes nylon fibers, glass fibers, carbon fibers, polyacrylonitrile fibers, polyaramid fibers, polytetrafluoroethylene fibers, basalt fibers, graphite fibers, ceramic fibers, or any combination thereof. Exemplary metals include bronze, copper, stainless steel, or any combination thereof. An exemplary salt includes a sulfate, a sulfide, a phosphate, or any combination thereof.

In an embodiment, the composite material can be an elastic material. A Young's modulus can be a measure of the stiffness of the composite material and can be determined from the slope of a stress-strain curve during a tensile test on a sample of the material. The composite material can have a Young's modulus of at least about 0.5 GPa, such as at least about 1.0 GPa, at least about 3.0 GPa, or even at least about 5.0 GPa.

In an embodiment, the composite material can have a relatively low coefficient of friction. For example, the coefficient of friction of the composite material can be not greater than about 0.4, such as not greater than about 0.2, or even not greater than about 0.15.

In another embodiment, the composite material can have a relatively high elongation. For example, the composite material can have an elongation of at least about 20%, such as at least about 40%, or even at least about 50%.

Returning to FIG. 1, the spring 104 is formed of a laser cut flat stock material that is folded or bent to form the spring. An exemplary flat stock material is formed of a metal or metal alloy. The metal alloy can be a stainless steel; a copper alloy such as beryllium copper and copper-chromium-zinc alloy; a nickel alloy such as Hastelloy, Ni220, Phynox, or Elgiloy; or the like; or a combination thereof. Additionally, the spring can be plated with a plating metal, such as gold, tin, nickel, silver or any combination thereof.

The flat stock can have a thickness of not greater than 10 mils, such as not greater than 5 mils, or even not greater than 3 mils. In particular, the thickness of the flat stock can be in a range of 1 mil to 5 mils, such as 1 mil to 3 mils, or even a range of 1.5 mils to 2.5 mils. In another example, the thickness can be in a range of 2 mils to 10 mils, such as 3 mils to 10 mils, or 5 mils to 10 mils. In an example, the flat stock is provided in the form of a ribbon having a width not greater than 10 inches, such as not greater than 5 inches. For example, the ribbon can have a width in a range of 0.5 inches to 10 inches, such as in a range of 0.5 inches to 5 inches, or even a range of 0.5 inches to 3 inches. Further, a ratio of the width of a spring work piece formed from the ribbon to the width of the ribbon can be at least 0.9, such as at least 0.95. In a particular example, the ratio of the width of the cut spring work piece to the width of the ribbon is approximately 1.0.

The jacket 102 defines an annular cavity 106 in which the spring 104 is disposed. As illustrated in FIG. 1, the cavity 106 which extends within the jacket 102 is accessible via an opening 108. As illustrated, the opening 108 is positioned on an axial side of the seal 100. An axial side is a side through which a line parallel to an axis of the seal 100 extends. Alternatively, the opening 108 can be formed on a radial side of the seal 100. A radial side is a side through which a radial line extending from the axis of the seal 100 extends. In an example, the opening 108 is disposed on a radially inward surface of the seal 100, facing the axis. Alternatively, the opening 108 is disposed on a radial outward surface of the seal 100, further from the axis than the radially inward surface.

Figure 3:
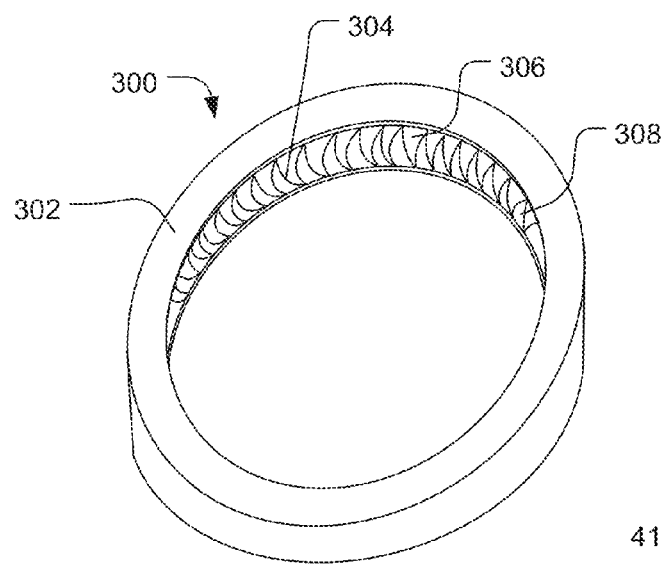
FIG. 3 includes a perspective-view illustration of an exemplary seal.
Figure 4:
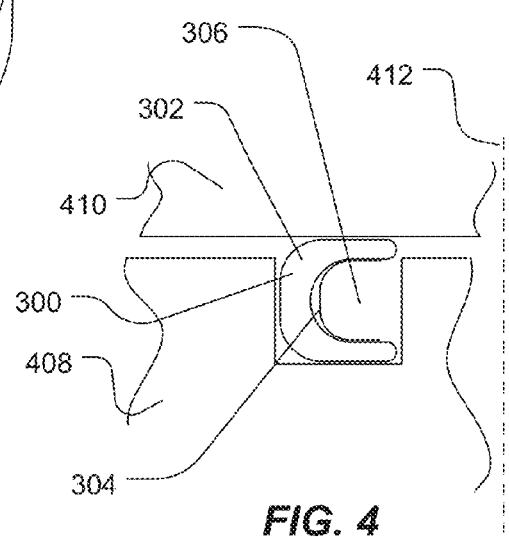
FIG. 4 includes a cross-sectional view illustration of an exemplary seal, such as the exemplary seal illustrated in FIG. 3.

For example, FIG. 3 includes an illustration of an exemplary seal 300, which includes a jacket 302 and a spring 304 disposed in a cavity 306 of the jacket 302. As illustrated, the opening 308 to the cavity 306 is disposed on a radially inward surface of the seal 300. Such a seal configuration is particularly useful as a face seal as illustrated in FIG. 4. For example, the seal 300 can be disposed in an annular space of a block 408 around an axis 412. A rotating component 410 that rotates about the axis 412 can be disposed to contact the seal 300. The spring 302 energizes sidewalls of the jacket 302 against a face of the rotating component 410.

To form the spring, a spring pattern is laser cut into a flat stock ribbon. The spring pattern includes a plurality of spring elements distributed longitudinally along the ribbon. Longitudinal refers to a direction parallel to the longest dimension of the ribbon or tube and latitudinal refers to cross dimension of the ribbon or tube extending perpendicular to the longitudinal dimension and thickness. Generally, the latitudinal dimension is the second longest orthogonal dimension of the ribbon or tube. In an example, the spring elements include tines, loops, or any combination thereof, which can extend latitudinally and can be connected to a spring body.

Figure 5:
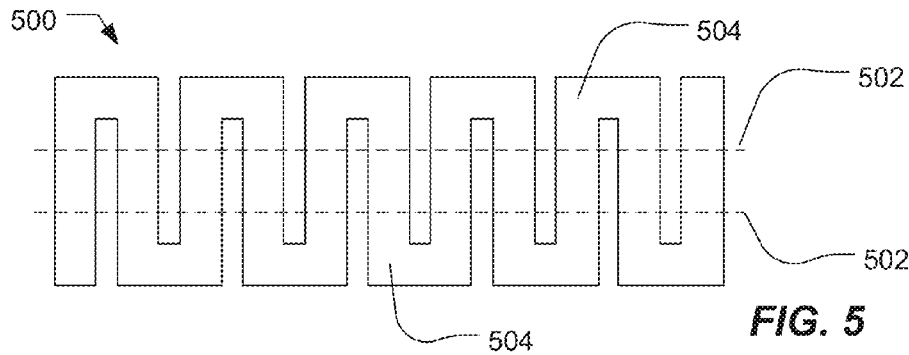
FIG. 5, FIG. 6, FIG. 7, and FIG. 8 include illustrations of exemplary spring patterns.

In an example illustrated in FIG. 5, a spring 500 includes a laser cut pattern that forms loops 504 which extend latitudinally across the width of a flat stock ribbon. Following patterning, the spring 500 can be bent along longitudinal creases 502 to form a U-shaped spring. Alternatively, the spring 500 can be bent along one or more creases extending longitudinally. For example, the spring 500 can be bent along a single longitudinal crease to form a V-shape. Alternatively, the spring 500 can be folded along three or more longitudinal creases to form more complex structures when viewed in cross-section.

Figure 6:
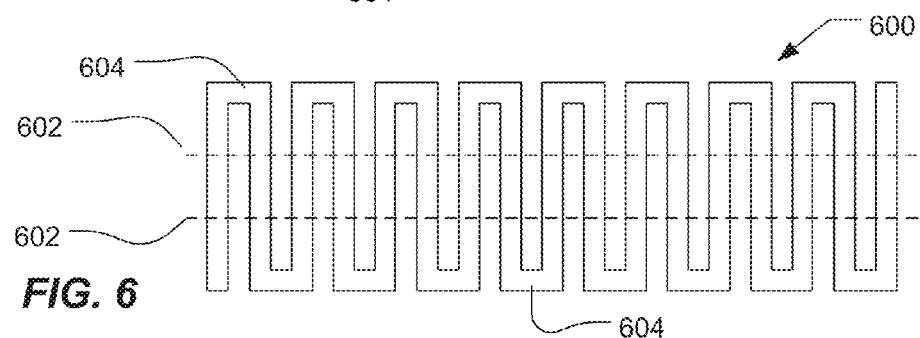

In another example illustrated in FIG. 6, a spring 600 can include loops 604 having a thinner cross-dimension than the pattern illustrated in FIG. 5. Once formed, the pattern 600 forms loops 604. Folds can be applied along a crease lines 602 extending longitudinally along the pattern to form a spring.

Figure 7:
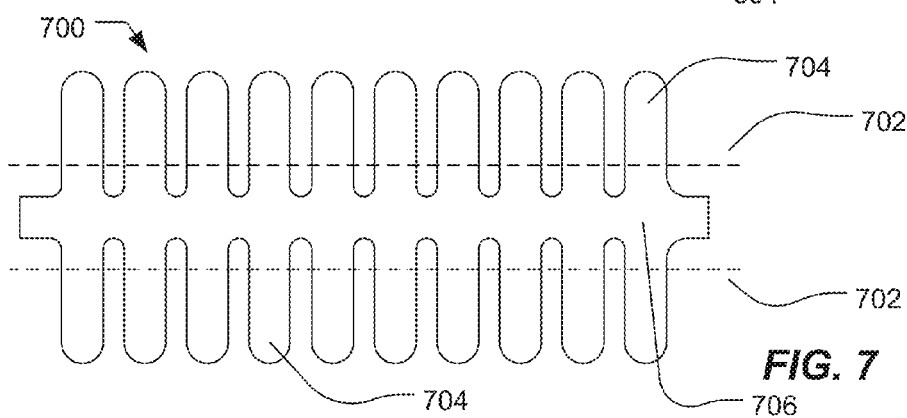

In an alternative example illustrated in FIG. 7, a pattern 700 can include tines 704 extending from a body 706 in a latitudinal direction. The pattern 700 can be folded along longitudinal crease lines 702 to form a spring.

Figure 8:
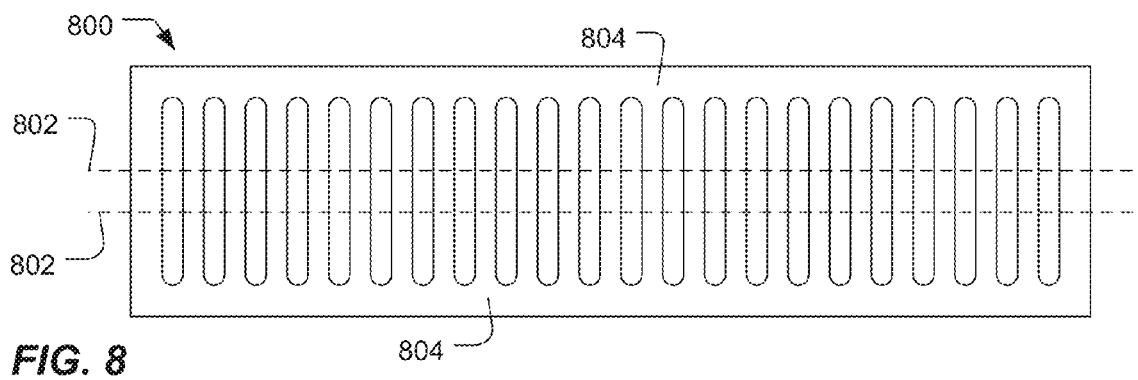

In an additional example illustrated in FIG. 8, a pattern 800 can be implemented with continuous strips 804 connected by cross-pieces 806. Such a pattern 800 can be folded along longitudinal crease lines 802 to form a spring such as a U-shaped or V-shaped spring.

Alternatively, the spring can be formed of a laser cut tube. The tube can be formed of the metal or metal alloys described above in relation to the flat stock. In an example, the resulting spring can have a spiral configuration. In another example, a plurality of spring elements distributed along the longitudinal length of the spring can be cut from the tube. For example, elements similar to the elements described above in relation to FIG. 5, FIG. 6, FIG. 7, and FIG. 8 can be cut from the tube to form a spring. The tube can have a thickness of not greater than 10 mils, such as not greater than 5 mils, or even not greater than 3 mils. In particular, the thickness of the flat stock can be in a range of 1 mil to 5 mils, such as 1 mil to 3 mils, or even a range of 1.5 mils to 2.5 mils. In another example, the thickness can be in a range of 2 mils to 10 mils, such as 3 mils to 10 mils, or 5 mils to 10 mils. The diameter (OD) of the tube can be in a range of 50 mils to 10 inches, such as a range of 50 mils to 5 inches, a range of 50 mils to 2 inches, a range of 50 mils to 1000 mils, or a range of 50 mils to 500 mils.

In an exemplary method, a ribbon or tube is dispensed or fed into a laser cutting apparatus. The laser cutting apparatus forms a pattern, such as the patterns illustrated in FIG. 5, FIG. 6, FIG. 7, or FIG. 8, into the ribbon or tube, or a helical or spiral pattern into the tube. The resulting spring work piece is continuously fed into a die. The die imparts folds along crease lines into the spring work piece. Subsequently, the work piece can be inserted into a cavity of a jacket to form a seal. In particular, the seal can be an annular seal and the cavity can extend annularly within a jacket.

Figure 9:
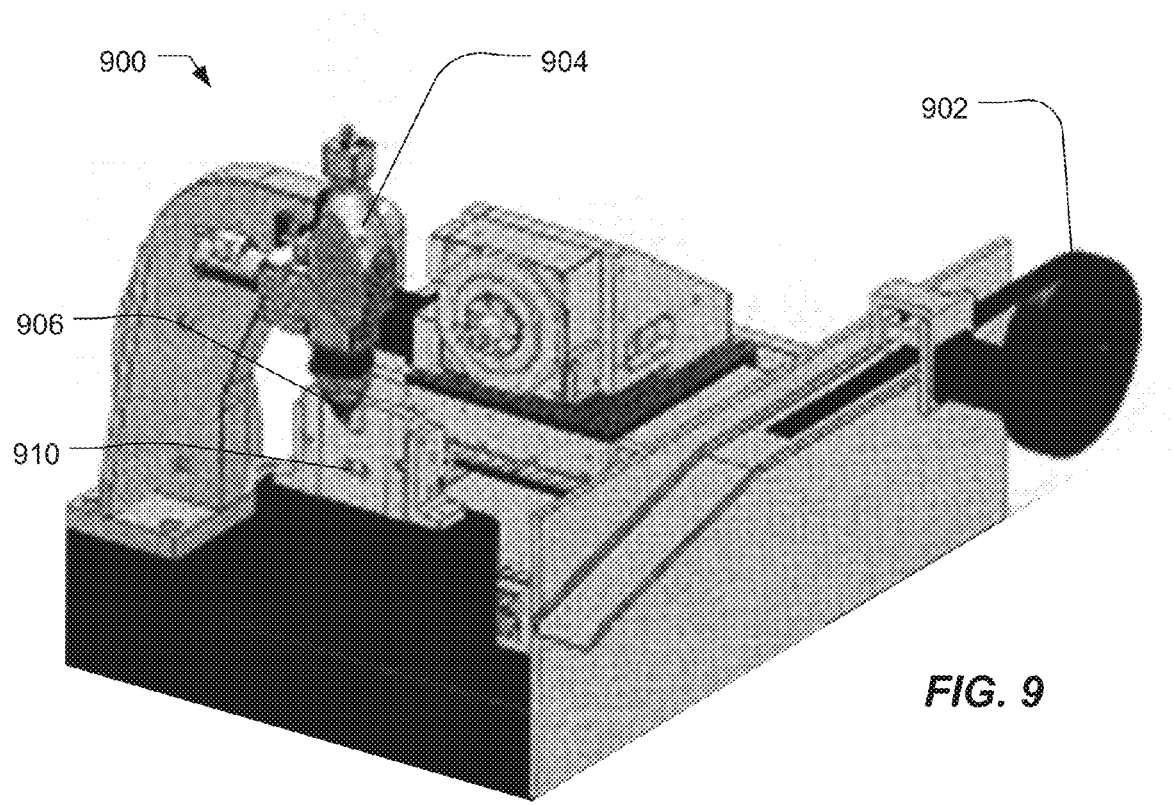
FIG. 9 includes an illustration of an exemplary laser cutting apparatus.

FIG. 9 includes an illustration of an exemplary cutting device 900, which feeds a ribbon 902 into a feed block 910. A laser head 906 is attached to a positioning system 904. As the ribbon 902 is fed into the feed block 910, the positioning system 904 manipulates the position of the laser at 910 which cuts the ribbon 902 to form a pattern of the spring work piece. In particular, the pattern includes a plurality of spring elements such as tines, loops, cross-pieces, or any combination thereof, that extend latitudinally across the ribbon 902 and are distributed longitudinally along the length of the ribbon 902.

In a particular example, the cutting device includes the laser head 906 and a laser core (not illustrated). The laser core can be fiber laser. A fiber laser is a laser in which the active gain medium is an optical fiber doped with rare-earth elements, such as erbium, ytterbium, neodymium, dysprosium, praseodymium, and thulium. Once the laser radiation is generated in the fiber active gain medium, the radiation can be guided to the target ribbon using additional optical fibers, guides, reflectors, or lenses.

Figure 10:
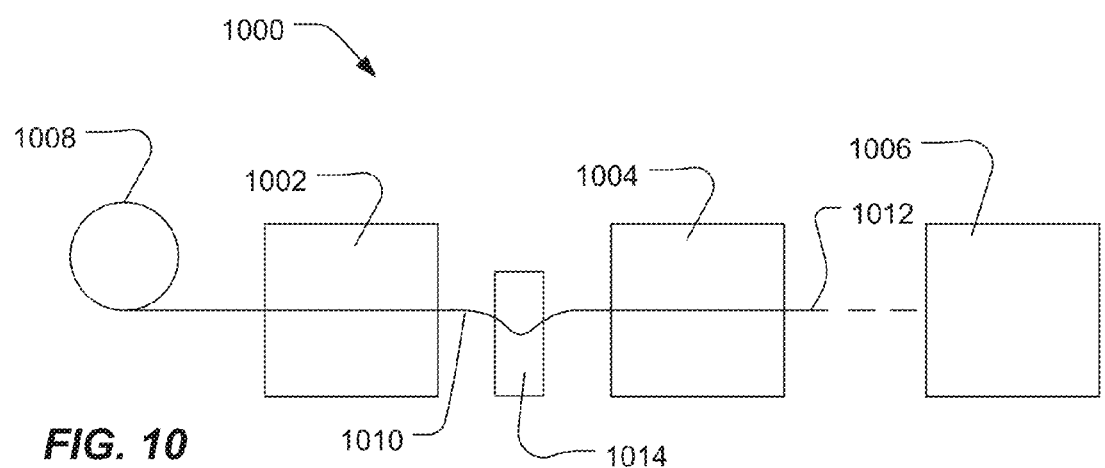
FIG. 10 includes an illustration of an exemplary system for manufacturing springs.

Such cutting devices 900 are particularly useful in a system to continuously form a spring work piece. As illustrated in FIG. 10, a system 1000 feeds a ribbon 1008 into a laser cutting device 1002 to produce a spring work piece 1010. Alternatively, a tube can be fed to the laser cutting device 1002. The laser cutting device 1002 cuts a pattern into the ribbon 1008 or a tube to form the spring work piece 1010. The pattern can include a plurality of spring elements that extend latitudinally across the ribbon 1008 and are distributed longitudinally along the spring work piece 1010. In particular, the spring elements are connected forming contiguous spring work pieces. For example, the spring elements can be loops formed as a serpentine pattern. In another example, the spring elements can be formed as tines extending from a spring body. In a further example, the spring elements can be connected on edges of the ribbon.

In an example, the spring work piece can be dispensed from the laser cutting device 1002 as a single continuous strip. In an alternative example, the laser cutting device can further cut the spring work piece latitudinally across the ribbon to form separate spring work pieces from the contiguous pattern.

A feeder 1014 guides the spring work piece into a die 1004. In an example, waste material is removed from the spring work piece 1010 before it is guided into the die 1004. The die 1004 folds the spring work piece along longitudinal creases to form the folded spring work piece 1012. When the spring work piece 1010 is in the form of a continuous strip, the die 1004 can be configured to continuously form the creases as the strip is fed into the die 1004. The die 1004 can include a cutter to cut the strip, either before folding or after folding, to form individual folded spring work pieces 1012.

Alternatively, when the spring work piece 1010 is in the form of separate spring work pieces, the feeder 1014 can be configured to feed each separate spring work piece into the die 1004. The die 1004 can include sensors and mechanisms to position the spring work piece 1010 and when the spring work piece 1010 is in position, fold the spring work piece 1010, such as in a single step.

The folded spring work piece 1012 can be supplied continuously or in a batch process to a device 1006 for inserting the folded spring work piece into the cavity of a seal jacket. In a particular example, the folded spring work piece 1012 is fed continuously into a device 1006 that further bends the spring work piece to form a circular form to be inserted into a cavity of an annular seal.

In a particular example, the laser cutting apparatus 1002 is a fiber laser having an optical fiber active gain medium. Such a fiber laser is contrasted with lasers that include active gain media in the form of a gas or solid core. Each of the fiber laser and the other lasers can transfer the emitted pulse by additional optical fibers. However, the presence of optical fibers does not necessarily imply that the laser is a fiber laser.

Applicants discovered that fiber lasers overcome difficulties associated with laser cutting of spring patterns in thin flat stock materials presented by other laser devices. In particular, Applicants discovered that such fiber lasers permit the formation of spring patterns in flat stock having a thickness not greater than 10 mils, such as a thickness in a range of 1 mil to 8 mils, or a range of 1 mil to 3 mils. Alternative laser technologies tended to produce imprecise cuts and overheating which led to warping of spring elements. Imprecise cuts or overheating can lead to inconsistencies within a spring, that leads to variable wear or poor sealing. Further, fiber lasers permit the precise cutting of thin flat stock which allows the formation of spring elements that extend latitudinally across a large portion of the ribbon. For example, the spring elements can extend at least 90% across the latitudinal width of the ribbon, such as at least 95%, or even approximately 100% across the latitudinal width of the ribbon. As such, with such precise cutting, a reduction in waste material can be achieved.

Figure 11:
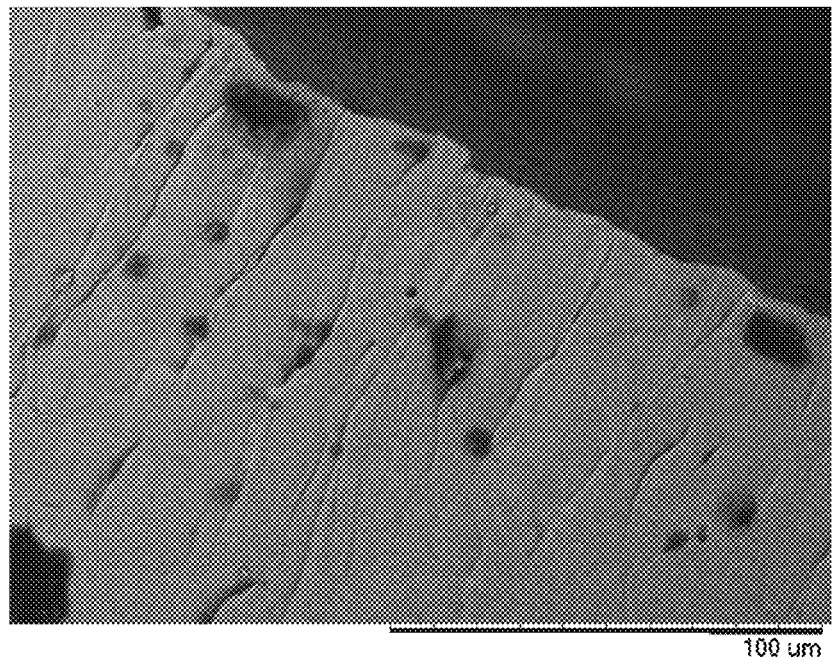
FIG. 11, FIG. 12, and FIG. 13 include illustrations of cut edges of flat stock material.
Figure 12:
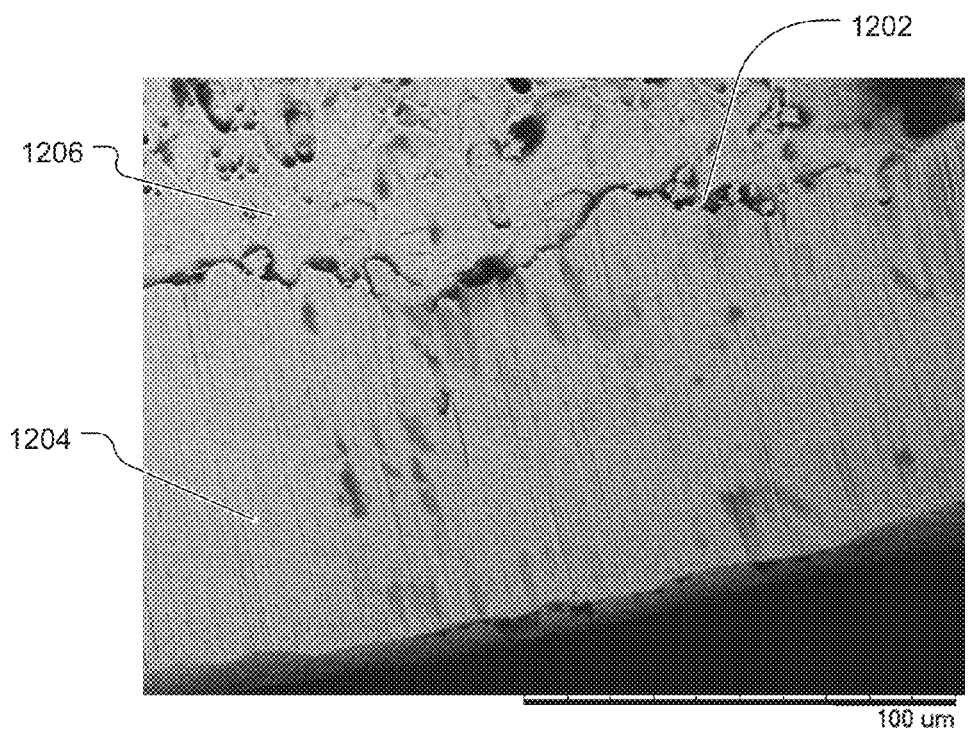

Further, such fiber lasers reduce strain and stress introduced at the edge of a patterned work piece. As illustrated in FIG. 11, a laser cut edge in an Elgiloy material provides a relatively smooth cut having only shallow undulations spaced apart at greater than 10 micrometers. In contrast, FIG. 12 includes an illustration of an exemplary stamp formed edge exhibiting a separation 1202 between surfaces 1204 and 1206, which have distinct patterns. The surface 1204 is indicative of plastic deformation formed by compressive forces followed by a fracture resulting in the surface 1206. An intermediate separation 1202 forms between the two surfaces 1204 and 1206.

Figure 13:
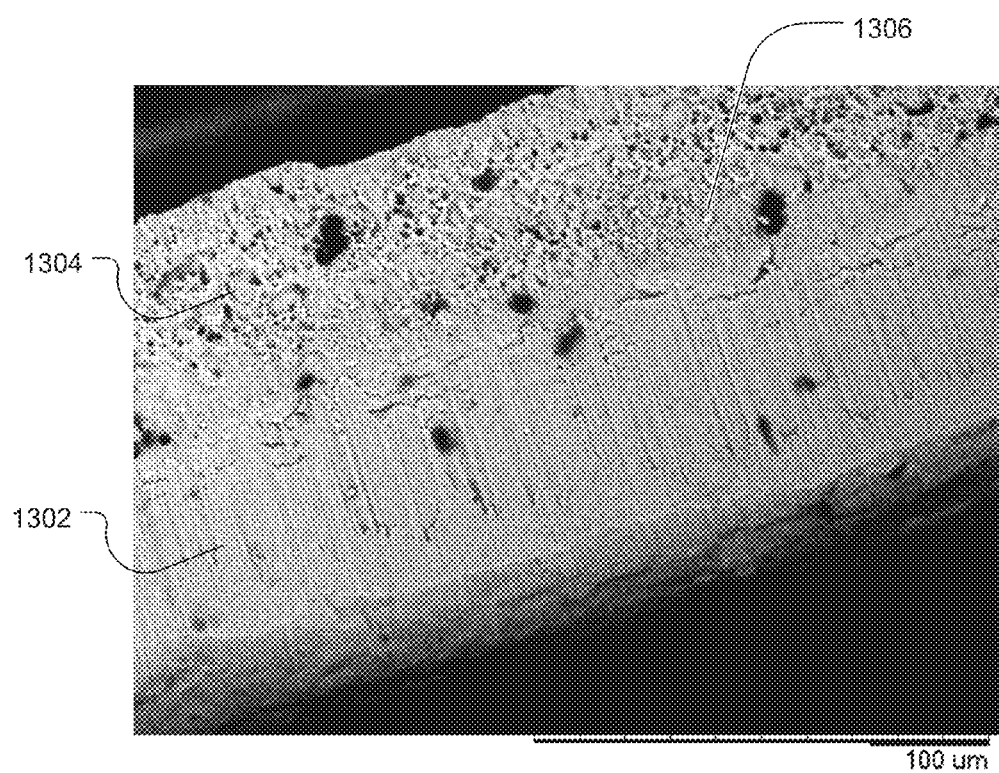

Edging, as illustrated in FIG. 13, produces a similar result in which two distinct surfaces 1302 and 1304 illustrate deformation followed by a fracture. Although the stress represented by horizontal striations 1306 between the two surfaces 1302 and 1304 are less prominent than those illustrated in FIG. 12, edging and stamping clearly introduce stress at an edge of an object that is not found in the laser cut sample. In contrast to the stamped and edged surfaces, the laser cut surfaces are free of a fracture surface and are free of striations or separations extending parallel to a surface of the cut ribbon.

It is believe that stamping, particularly for metal thicknesses in a range of 3 mils to 8 mils causes a hardening of the spring material not found when laser cutting. Such hardening can result in early fatigue in spring configurations.

EXAMPLE

Fatigue tests are performed on samples of U-shaped springs. The U-shaped springs are formed of flat stock material, patterned either by cutting with a fiber laser device or by stamping. The patterned flat stock material is folded into the U-shaped spring. The resulting U-shaped spring is a cantilever finger spring design, similar to the spring of the Omniseal 400A, available from Saint-Gobain. Sample springs are prepared from 304 Stainless Steel having a thickness of 2 mils and from 301 Stainless Steel having a thickness of 5 mils.

Testing is performed by cycling the fingers of the spring between a flexed position and a relaxed position. At the ends of the fingers, the flexed position is inward approximately 20 mils to 30 mils toward a center of the spring relative to the relaxed position. The samples are cycled until failure through fatigue or for one million cycles.

As illustrated in Table 1, the 2-mil stainless steel samples patterned by either laser cutting or stamping survived flexing for one million cycles. For the 5 mil samples, the laser cut sample cycled 200,000 cycles, twice as long as the stamped cycles.

TABLE 1

Flex Testing of Stainless Steel Samples

| Sample | Material | Method | Thickness (mils) | Cycles-to-Failure |
|---|---|---|---|---|
| 1 | 304 SST | Laser | 2 | >1M |
| 2 | 304 SST | Stamp | 2 | >1M |
| 3 | 301 SST | Laser | 5 | 200,000 |
| 4 | 301 SST | Stamp | 5 | 100,000 |

In a first aspect, a seal includes a polymeric jacket defining a seal surface and an inner cavity extending within the polymeric jacket along a length of the polymeric jacket and a spring extending within the inner cavity and including a plurality of laser cut spring elements.

In an example of the first aspect, an edge of the spring is free of a fracture surface. In another example, an edge of the spring is free of a separation.

In a further example, the polymer jacket includes a polymeric material selected from the group consisting of polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, a liquid crystal polymer, or any combination thereof. In another example, the polymer jacket further includes a filler selected from the group consisting of a solid lubricant, a ceramic or mineral filler, a polymer filler, a fiber filler, a metal particulate filler, salts, or any combination thereof.

In an additional example, the polymer jacket has a coefficient of friction of not greater than about 0.4, such as not greater than about 0.2.

In another example, the polymer jacket has a Young's modulus of at least about 0.5 GPa, such as at least about 1.0 GPa. The polymer jacket can have an elongation of at least about 20%, such as at least about 40%.

In an example, the spring is formed of a metal alloy selected from the group consisting of stainless steel, a copper alloy, a nickel alloy, or any combination thereof. In another example, the spring is formed of a sheet material having a thickness not greater than 10 mils, such as not greater than 5 mils, or not greater than 3 mils.

In a particular example, the seal is an annular seal or a face seal.

In a second aspect, a seal includes an annular jacket comprising a polymeric material and defining an annular cavity extending within the annular jacket and a spring extending within the annular cavity, the spring comprising a folded sheet metal including a plurality of laser cut spring elements.

In an example of the second aspect, an edge of the spring is free of a fracture surface. In another example, an edge of the spring is free of a separation.

In a further example, the polymeric material is selected from the group consisting of polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, a liquid crystal polymer, or any combination thereof. In an additional example, the annular jacket further includes a filler selected from the group consisting of a solid lubricant, a ceramic or mineral filler, a polymer filler, a fiber filler, a metal particulate filler, salts, or any combination thereof.

In another example, the annular jacket has a coefficient of friction of not greater than about 0.4. In a further example, the annular jacket has a Young's modulus of at least about 0.5 GPa. In an additional example, the annular jacket has an elongation of at least about 20%.

In a further example, the spring is formed of a metal alloy selected from the group consisting of stainless steel, a copper alloy, a nickel alloy, or any combination thereof. In an additional example, the spring is formed of a sheet material having a thickness not greater than 10 mils.

In a third aspect, a method of forming a seal includes dispensing a ribbon of sheet metal, laser cutting a plurality of spring elements distributed longitudinally along the ribbon to form a spring work piece, and folding the spring work piece to form a spring.

In an example of the third aspect, laser cutting includes laser cutting with a fiber laser. In another example, laser cutting includes laser cutting the plurality of spring elements to extend latitudinally across the ribbon.

In an additional example, the plurality of spring elements extend to have a ratio of the width of a spring work piece formed from the ribbon to the width of the ribbon of at least 0.9, such as at least 0.95. In a particular example, the ratio is approximately 1.0.

In a further example, the spring work piece is a continuous piece and wherein folding the spring work piece includes continuously folding the spring work piece. In another example, laser cutting the ribbon to form separate spring work pieces.

In an additional example, folding the spring work piece includes positioning the spring work piece and folding the positioned spring work piece. In an example, the method further includes inserting the spring into a seal jacket.

In a fourth aspect, a method of forming a seal includes dispensing a ribbon of sheet metal having a thickness of not greater than 5 mils, forming with a fiber laser device a plurality of spring elements distributed along a length of the ribbon and extending latitudinally across the ribbon, cutting the laser cut ribbon with the laser device to form a spring work piece, and folding the spring work piece along a longitudinal length of the ribbon.

In an example of the fourth aspect, the plurality of spring elements extend to have a ratio of the width of a spring work piece formed from the ribbon to the width of the ribbon of at least 0.9.

In an additional example, folding the spring work piece includes positioning the spring work piece and folding the positioned spring work piece. In a further example, the method includes inserting the spring into a seal jacket.

In a fifth aspect, a machine includes a static component, a rotatable component, and a seal disposed between the static component and the rotatable component. The seal includes a polymeric jacket defining a seal surface and an inner cavity extending within the polymeric jacket along a length of the polymeric jacket and a spring extending within the inner cavity and including a plurality of laser cut spring elements.

In a sixth aspect, a method of forming a seal includes dispensing a tube, laser cutting the tube to form a spring work piece, and inserting the spring work piece into a jacket to form the seal.

In an example of the sixth aspect, laser cutting the tube include cutting a spiral. In another example, laser cutting the tube includes cutting a pattern of spring elements distributed longitudinally along the length of the tube.

In an additional example, the method further includes rotating the tube while laser cutting. In a further example, the tube includes a metal or metal alloy.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to jacket a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a seal, the method comprising: providing a ribbon of sheet material having a thickness of not greater than 10 mils; cutting with a fiber laser device a plurality of spring elements distributed
    longitudinally along the ribbon to form a spring work piece, the fiber laser device
    comprises a fiber laser including an optical fiber active gain medium; and folding the spring work piece to form a spring.

2. The method of claim 1, wherein the sheet material comprises a metal alloy selected from the group consisting a stainless steel, a copper alloy, a nickel alloy, or any combination thereof.

3. The method of claim 1, wherein cutting includes cutting the plurality of spring elements to extend latitudinally across the ribbon.

4. The method of claim 1, wherein the plurality of spring elements extend to have a ratio of the width of a spring work piece formed from the ribbon to the width of the ribbon of at least 0.9.

5. The method of claim 1, wherein the ratio is at least 0.95.

6. The method of claim 5, wherein the ratio is approximately 1.0.

7. The method of claim 1, wherein the sheet metal has a thickness of not greater than 8 mils.

8. The method of claim 1, wherein the spring work piece is a continuous piece and wherein folding the spring work piece includes continuously folding the spring work piece.

9. The method of claim 1, further comprising cutting the ribbon to form separate spring work pieces with the fiber laser device.

10. The method of claim 1, wherein folding the spring work piece includes positioning the spring work piece and folding the positioned spring work piece.

11. The method of claim 1, further comprising inserting the spring into a seal jacket.

12. A method of forming a seal, the method comprising:
    dispensing a ribbon of sheet metal having a thickness of not greater than 8 mils;
    forming with a fiber laser device a plurality of spring elements distributed along a length of the ribbon and extending latitudinally across the ribbon, wherein the fiber laser
device comprises a fiber laser including an optical fiber active gain medium;
cutting the ribbon with the fiber laser device to form a spring work piece; and
folding the spring work piece along a longitudinal length of the ribbon.

13. The method of claim 12, wherein the plurality of spring elements extend to have a ratio of the width of a spring work piece formed from the ribbon to the width of the ribbon of at least 0.9.

14. The method of claim 12, wherein folding the spring work piece includes positioning the spring work piece and folding the positioned spring work piece.

15. The method of claim 12, further comprising inserting the spring into a seal jacket.

16. A method of forming a seal, the method comprising:
dispensing a tube having a thickness of not greater than 10 mils;
cutting the tube with a fiber laser device to form a pattern of spring elements
distributed longitudinally along the length of the tube, wherein the fiber laser
device comprises a fiber laser including an optical fiber active gain medium.

17. The method of claim 16, wherein cutting the tube includes cutting a spiral.

18. The method of claim 16, wherein cutting the tube includes cutting the tube having the pattern of the spring elements to form a spring work piece.

19. The method of claim 16, further comprising rotating the tube while cutting.

20. The method of claim 16, wherein the tube includes a metal or metal alloy.

* * * * *